G. M. HUSTON.
VEHICLE SPRING.
APPLICATION FILED MAY 25, 1912.
1,036,247.
Patented Aug. 20, 1912.
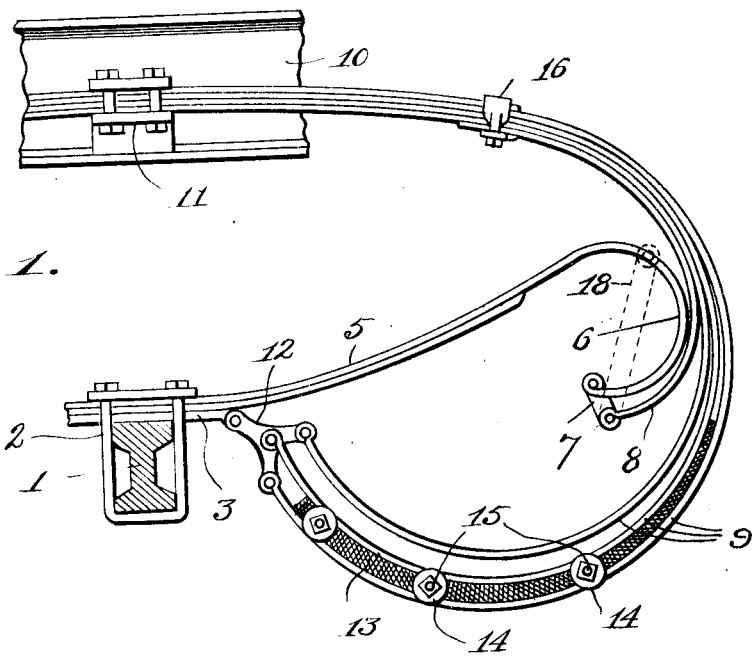
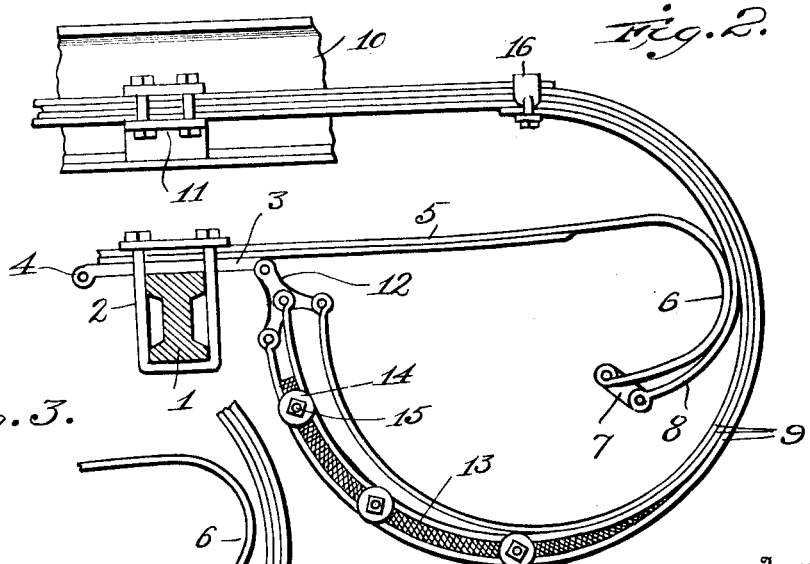
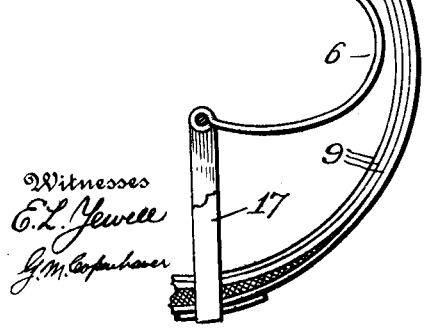

UNITED STATES PATENT OFFICE.

GEORGE M. HUSTON, OF NEW YORK, N. Y.

VEHICLE-SPRING.

1,036,247.  Specification of Letters Patent.  Patented Aug. 20, 1912.

Application filed May 25, 1912. Serial No. 699,654.

*To all whom it may concern:*

Be it known that I, GEORGE M. HUSTON, a citizen of the United States, residing at New York, in the borough of Manhattan and State of New York, have invented new and useful Improvements in Vehicle-Springs, of which the following is a specification.

My invention relates to vehicle springs, and has for its object certain improvements in the construction disclosed in applications for Letters Patent, filed by me April 3, 1912, Serial No. 688,326, and April 18, 1912, Serial No. 691,651, as will be hereinafter more particularly described and claimed, reference being had to the accompanying drawing, in which:

Figure 1 is a side elevation of my improved construction shown applied to a vehicle axle and body, said axle being shown in section. Fig. 2 is a similar view showing the device under tension. Fig. 3 is a detail view illustrating a modified construction.

In the said drawing the reference numeral 1 denotes one of the axles of an automobile or other vehicle, the same being shown I-shaped in cross section, though it may be of any configuration. Bolted to said axle at 2 is a plate 3, the same having formed integral therewith an eye 4 at each side of said axle, as shown. Bolted or otherwise fixed to said plate 3 is a leaf spring 5, formed of any desired number of leaves, said spring being curved downwardly and inwardly at its outer end 6, for a purpose hereinafter to be described. Said spring is at its outer end connected, by a shackle 7, with the free end of the innermost leaf 8 of a series of spring leaves 9. Said spring leaves 9 are conjointly connected to the vehicle body 10 at a point 11 directly above the axle, and extend downwardly therefrom in the arcs of circles to a shackle 12 to which they are separately pivoted in spaced relation, said shackle being in turn pivoted to one of the eyes 4 of plate 3. Said shackle 12 is of substantially Y-shape, the spring leaves being so connected thereto, as shown, that the center leaf is practically unaffected by any movement of said shackle on its pivot 4, due to relative movement of the axle 1 and the body 10, whereas the outermost leaf will be drawn toward the center leaf to increase their area of contact, and the innermost leaf will be simultaneously forced or pushed toward said center leaf with the same result.

To neutralize the shock of metal on metal I interpose between the outermost and center leaves a filler 13 of india rubber or other elastic material, the same being thickest at its end nearest the shackle and gradually thinning toward its other end. Said filler is retained against lateral displacement by means of retaining washers 14 large enough to span the space between said leaves and held in position by rods 15 passing through the filler from side to side.

In operation when the axle 1 and body move toward each other the down pull exerted by the spring leaves 9 on shackle 12 will cause the latter to turn on its pivot 4 toward the position shown in Fig. 2, which movement, while it will but slightly affect the center leaf, will pull the outermost leaf and will push the innermost into a greater area of contact with the center leaf, said operation compressing the rubber pad 13. At the same time the down thrust of spring leaf 8 will, through shackle 7, draw down the outer end 6 of leaf spring 5, causing its curved end to rock or roll against the body of leaf 8 and thus force the latter against the innermost of the leaves 9, as shown in Fig. 2, the whole operating to offer a powerful resistance to shocks.

While I have shown my improved construction applied to one side only of the axle 1, it will be understood that it may be duplicated upon the other side, as in my applications hereinbefore referred to. As in said applications I employ a clip 16 for binding together the spring leaves, and I prefer to terminate leaf 8 at said clip, so that by shifting the position of said clip the location of said leaf will be correspondingly shifted to vary the normal position of the outer end of spring 5.

In Fig. 3 I have shown a modified construction wherein the spring leaf 8 is dispensed with and the rounded outer end 6 of leaf spring 5 is brought into contact with the innermost of spring leaves 9, said outer end 6 having connected therewith a stirrup 17 which passes around the spring leaves 9, as shown, and acts to pull down said outer end 6 and cause it to rock or roll into wedging contact with the innermost spring leaf 9.

It may sometimes be desired to dispense with the rolling action of leaf spring 5, which I do by cutting off its curved end 6 and connecting the end of spring leaf 8 with said shortened end of leaf spring 5 by means of a shackle 18, as shown in dotted lines in Fig. 1.

Having thus described my invention, what I claim as new and desire to secure by Letters Patent is:—

1. A spring construction for vehicles, embodying a spring leaf extending between the two members, a leaf spring attached to one member and curved at its outer end into contact with said spring leaf, and means for causing said leaf spring under strain to rock in wedging action against said spring leaf.

2. A spring construction for vehicles, embodying a spring leaf extending between the two members, a supplemental similarly curved leaf connected to one of the members, and a leaf spring attached to the other member, the two being connected at their adjacent ends and said leaf being curved at said connected end so as to rock said spring leaf against its companion spring leaf when under strain.

3. A spring construction for vehicles, embodying a plurality of similarly curved spring leaves fixed to one member in contact with each other and gradually separating toward their points of connection with the other member, a supplemental similarly curved leaf connected to one of the members, and a leaf spring attached to the other member, the two being connected at their adjacent ends and said leaf spring being curved at said connected end so as to roll said spring leaf against its companion spring leaves when under strain.

4. A spring construction for vehicles, embodying a plurality of similarly curved spring leaves fixed to one member in contact with each other and gradually separating toward their points of connection with the other member, and means connecting said separated ends to said other member and operating under strain to automatically pull the outermost spring leaf and push the innermost spring leaf into contact with the center leaf.

5. A spring construction for vehicles, embodying a plurality of similarly curved spring leaves fixed to one member in contact with each other and gradually separating toward their points of connection with the other member, and a shackle pivotally connecting said separated ends to said other member and operating under strain to automatically pull the outermost spring leaf and push the innermost spring leaf into contact with the center leaf.

6. A spring construction for vehicles, embodying a plurality of similarly curved spring leaves fixed to one member in contact with each other and gradually separating toward their points of connection with the other member, and a filler of elastic material disposed between said leaves and shaped to conform substantially to the normal angle of separation therebetween.

7. A spring construction for vehicles, embodying a plurality of similarly curved springs leaves fixed to one member in contact with each other and gradually separating toward their points of connection with the other member, a filler of elastic material disposed between said leaves, and retaining washers mounted on rods passing transversely through said filler and spanning the space between adjacent spring leaves.

In testimony whereof I have hereunto set my hand in the presence of two subscribing witnesses.

GEORGE M. HUSTON.

Witnesses:
 PERCY B. HILLS,
 EDWIN L. YEWELL.